Oct. 9, 1951  O. H. SCHMITT ET AL  2,570,870
ELECTRICAL BRIDGE COMPENSATION
SYSTEM FOR MAGNETOMETERS
Filed June 29, 1944
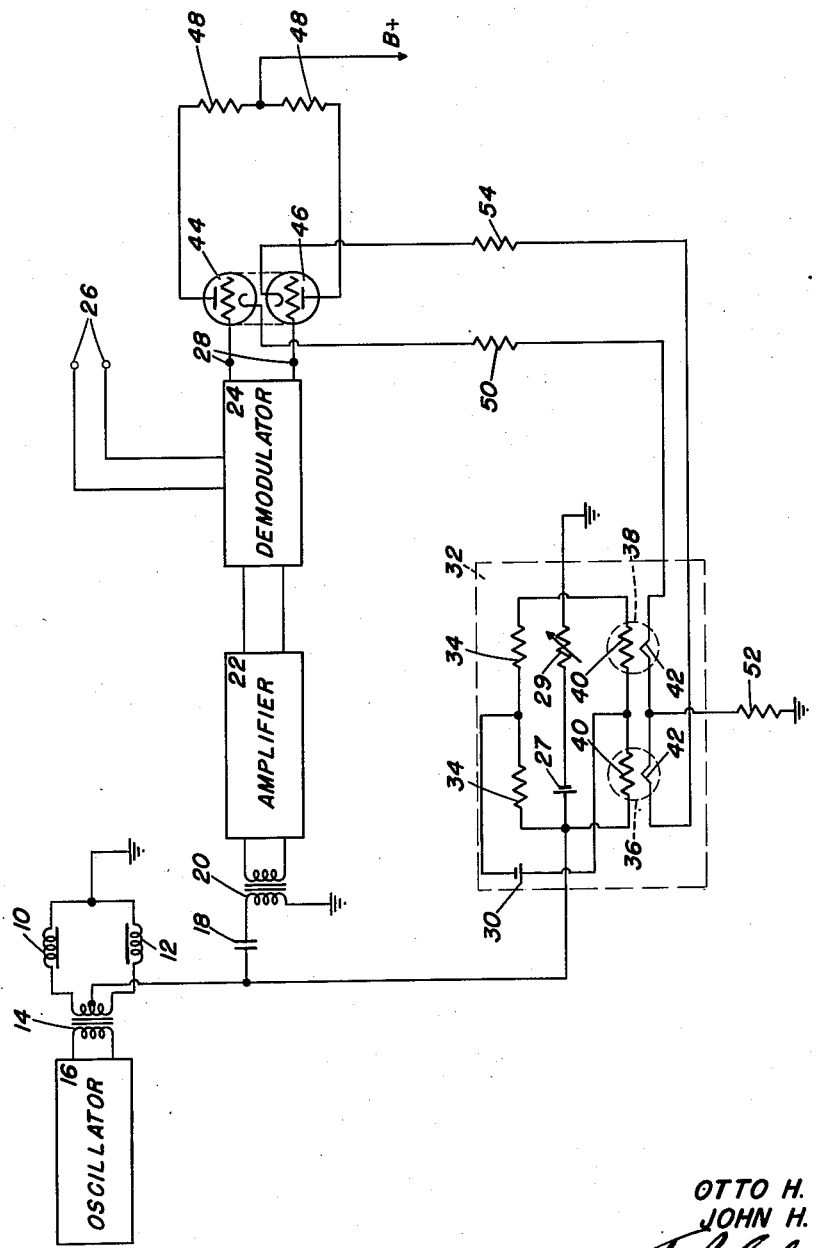
Inventors
OTTO H. SCHMITT
JOHN H. HIDY Patented Oct. 9, 1951

2,570,870

UNITED STATES PATENT OFFICE 2,570,870

ELECTRICAL BRIDGE COMPENSATION SYSTEM FOR MAGNETOMETERS

Otto H. Schmitt, Port Washington, and John H. Hidy, Garden City, N. Y., assignors to the United States of America as represented by the Secretary of the Navy Application June 29, 1944, Serial No. 542,658

6 Claims. (Cl. 177—380)

This invention relates to compensation systems for magnetometers and more particularly to automatic systems for compensating magnetometers for changes in the ambient magnetic field acting thereon.

In one application, magnetometers may be used to measure small and relatively rapid changes or anomalies in the magnitude of relatively uniform magnetic fields. When magnetometers are so used, it is usual to provide compensation means whereby the effect of the ambient magnetic field is substantially eliminated thereby to render the magnetometer sensitive only to anomalies.

In those types of magnetometers in which the magnetometer element comprises a core of high-permeability material and a pickup coil mounted thereon, compensation may be effected by means of a direct current passed through the pickup coil system in the proper magnitude and polarity to balance out the effect on the magnetometer of the ambient magnetic field. As a result of such compensation, the resultant field acting on the magnetometer approaches zero unless an anomaly occurs. While such compensation need not be exact, it is found, in general, that magnetometer elements and the equipment associated therewith will tolerate only a limited uncompensated field before loss of sensitivity occurs.

In certain applications of magnetometers, the magnitude of the ambient magnetic field necessarily undergoes protracted and substantially continuous change, this condition existing particularly in the case of portable magnetometers adapted to make field measurements from moving carriers. In such cases, it is usual to make frequent changes in the compensation for the magnetometer in order to hold the resultant magnetic field within the tolerance range of the magnetometer. Such changes in compensation may be made manually or, and as disclosed in copending application Serial No. 542,379, filed June 27, 1944, Magnetometer Compensation System, Otto H. Schmitt, automatic means responsive to variations in the magnetometer output and arranged to compensate only for protracted changes in the magnitude of the magnetic field may be used for this purpose. In one such arrangement, a vacuum tube was used to control the bias current to the magnetometer elements and an R. C. circuit was relied upon to delay compensation sufficiently to allow transmission through the detection equipment of signals corresponding to anomalies.

Objects of the present invention are to provide automatic compensating means which do not require the use of R. C. circuits, thereby to reduce the space required in its construction, and generally to improve operation of automatic compensating systems by extending the range of time-delay intervals obtainable.

In view of the above, the invention in one aspect provides in a compensated magnetometer system for measuring changes other than protracted changes in a magnetic field, a magnetometer sensitive to all changes in the field, a source of compensating current for the magnetometer, and means for controlling the flow of current from the source to the magnetometer, such means comprising a normally balanced bridge circuit including a pair of variable impedance elements, the input diagonal of the bridge being connected to the current source and the output diagonal of the bridge being connected to the magnetometer, and means operable in response to variations in the output of the magnetometer due to all changes in the field but effective only after a chosen time delay to vary the impedance offered by the impedance elements, the time delay being such that compensation occurs only for protracted changes in the field.

While the compensation system of the invention is useful in conjunction with any magnetometer in which compensation is effected by means of a balancing or biasing current, its operation is particularly advantageous in conjunction with the magnetometer of copending application Serial No. 516,612, field January 1, 1944, for Unbalanced Magnetometers, now Patent No. 2,560,132, issued July 10, 1951, by Otto H. Schmitt, together with the detection system disclosed in copending application Serial No. 531,624, filed April 18, 1944, for Detection Systems, of Otto H. Schmitt. When the system of this invention is used in conjunction with the above-mentioned magnetometer and detection system, the compensating means is controlled by the output of the demodulator stage of the magnetometer.

The above and other features of the invention will be described in the following detailed specification, and pointed out in the claims.

In the drawing, the single figure is a circuit diagram of one compensation system according to the invention, this system being shown in conjunction with a magnetometer and a detection system of the types disclosed in the copending applications referred to above.

The compensation system of the invention comprises essentially a feedback loop in which the output of the demodulator or the detector stage of a magnetometer is used automatically to control the magnitude of a direct current which is fed to the magnetometer elements. Conveniently, and as shown, a manually operated bias system is provided in addition to the automatic system. The manually operated system is used roughly to balance out the ambient field when the magnetometer is first placed in operation. Thereafter, the automatic system of the invention is relied upon to effect the changes in compensating current required to maintain the resultant field within the desired limits irrespective of protracted variations in the ambient field.

In general, the feedback loop contains means responsive to variations in the output of the demodulator stage for varying the direct current used to bias the magnetometer elements. Time-delaying means are incorporated to delay compensation to an extent sufficient to allow transmission of anomalies. Conveniently, and as shown in the drawing, a separate source is used for bias current and time delay is obtained through the use of a bridge control circuit including variable impedance elements. It will be understood, however, that other time-delay bridge arrangements may be used in place of the particular arrangement shown therein.

In the drawing, there is shown a magnetometer comprising magnetometer elements 10 and 12, arranged to be driven through transformer 14 by oscillator 16, the output of the magnetometer elements being applied, through capacitor 18 and transformer 20, to detection equipment including at least an amplifier 22 and a demodulator 24. Preferably amplifier 22 may comprise one or more push-pull stages and demodulator 24 may be double-ended. Demodulator 24 is conveniently provided with two sets of output terminals 26 and 28. Output terminals 26 may be connected to additional detection equipment (not shown), in which case the entire two-sided output of the demoulator stage is used. A portion of the two-sided output of the demodulator stage appears across output terminals 28 to which control circuits for the compensation system may be connected.

The manually operated bias system used to balance out the major part of the ambient field at magnetometer elements 10 and 12 comprises battery 27, connected through manually variable resistor 29 to the center tap of the secondary winding of transformer 14, the circuit being completed through ground as indicated. The polarity of battery 27 is such that the field produced at the elements by the bias current therefrom will be in the proper direction to cancel the ambient field at that point. Ordinarily, the magnetometer will be used under such conditions that the ambient field will always thread the magnetometer elements in the same direction and the polarity of battery 27 need not be changed.

Once rough balance has been obtained using the manual system above described, additional compensating or bias current for balancing out the effect of protracted changes in the ambient field is supplied to magnetometer elements 10 and 12 by battery 30 connected across the input diagonal of an impedance bridge indicated generally at 32, the magnetometer elements being connected across the output diagonal of this bridge. Impedance bridge 32 comprises two matched resistance arms 34, and two arms containing variable impedance elements 36 and 38. The magnitude and polarity of the bias current to the magnetometer elements is controlled by means of variations in the impedance offered by impedance elements 36 and 38. Conveniently variations in the impedance of the impedance elements are made in accordance with variations in the output appearing across terminals 28 of demodulator 24, in a manner described below.

Each of variable impedance elements 36 and 38 comprises a resistor 40 the resistance of which varies inversely with a nonlinear function of its temperature, and a heater 42 arranged to vary the temperature of resistance element 40 in accordance with variations in the current passing through the heater. Thus, as current through heater 42 is increased, the temperature of resistance element 40 is increased, causing a decrease in its resistance. Because changes in the current through heaters 42 do not cause instantaneous changes in temperature of each of resistance elements 40, changes in the impedance offered by the variable impedance elements lag changes in the current through the heaters by an appdeciable time, the amount of such lag depending upon the magnitude of the total heater current.

Control of current to heaters 42 of variable impedance elements 36 and 38 is effected by means of a pair of vacuum tubes 44 and 46, one of which is associated with each of heaters 42 in the following manner. The grid of vacuum tube 44 is connected to one of output terminals 28 of demodulator 24, while the grid of vacuum tube 46 is connected to the other of these output terminals. Plates of vacuum tubes 44 and 46 are connected through load resistors 48 to a source of positive potential indicated at B+. The cathode of vacuum tube 44 is connected through series resistor 50, heater 42 of variable impedance element 38, and resistor 52 to ground. Similarly, the cathode of vacuum tube 46 is connected through series resistor 54, heater 42 of variable impedance element 36, and resistor 52 to ground.

Considering the action of the automatic compensating circuit just described, it will be seen that an increase in current through vacuum tube 44 causes a decrease in the resistance offered by impedance element 38, while an increase in the current through vacuum tube 46 causes a similar decrease in the resistance offered by impedance element 36. Since the demodulator output is two-sided, it will appear that an increase in the plate current of vacuum tube 44 will always be accompanied by a decrease in the plate current of vacuum tube 46. Referring now to copending application Serial No. 531,624, filed April 18, 1944, mentioned above, for the operation of the detection system, it will be found that, when the ambient field acting on magnetometer elements 10 and 12 is just balanced out by the biasing current supplied thereto, and when there is no change or anomaly acting on these elements, the two sides of the output of demodulator 24 will be just equal. Furthermore, as taught in the copending applications above referred to, when an anomaly occurs, the output of demodulator 24 will vary accordingly, for example, shifting first in a positive and then in a negative sense in response to similar variations in the magnitude of the magnetic field at the magnetometer elements. Changes in the output of demodulator 24 also occur whenever the ambient field is not completely compensated by the bias current supplied to the magnetometer elements. In this case, one side of the output of demodulator 24 is increased with respect to ground, while the other side is decreased. Since such changes in the ambient field are ordinarily protracted and of constant polarity, their effect is to produce an increasing unbalance in the output of the demodulator.

As indicated above, both anomalies and protracted changes in the ambient field produce unbalanced outputs at the demodulator. In the case of the anomaly, the output of the demodulator returns to the balance condition as soon as the anomaly has passed. In the case of protracted changes in the ambient field, however, the unbalance condition continues until some change is made in the bias current through elements 10 and 12.

When the output of demodulator 24 becomes unbalanced, the voltages applied to the grids of vacuum tubes 44 and 46 become unequal, with the result that the currents through heaters 42 of variable impedance elements 36 and 38 also become unbalanced. Thus, if the signal applied to the grid of vacuum tube 44 is increased, that applied to vacuum tube 46 is decreased. Correspondingly the resistance in the bridge circuit due to impedance element 38 is decreased, while that due to impedance element 36 is increased by a like amount. This results in unbalance of the bridge which in turn causes current from battery 30 to flow through elements 10 and 12, the magnitude and polarity of this current being proper substantially to balance out the ambient field acting on the elements, thereby again returning the output of demodulator 24 substantially to balance. Unbalance of the output of demodulator 24, due to changes in the field acting on magnetometer elements 10 and 12, thus operates continuously to introduce compensating changes in the bias current applied to the magnetometer elements.

In order that anomalies may be detected, some means must be used to prevent compensation by the system just described of relatively rapid changes in the magnetic field acting at the magnetometer elements. The time-lag of impedance elements 36 and 38 described above is utilized for this purpose. As previously stated, the amount of this lag depends primarily upon the magnitude of the total current through their heaters. When the total heater current is large, the resistance offered by the variable impedance elements varies more rapidly than when the total heater current is relatively small. Thus it can be seen that, for a given change in the signal applied to input transformer 20, the time of response of the bias circuit may be varied by changing the amplification produced by amplifier 22 and by control tubes 44 and 46. Variation in the portion of the demodulator output appearing across terminals 28, also controls the time of response. If the portion of the output across terminals 28 is held constant, it will be seen that, the higher the gain in the amplifier stages, the more rapid the response of the compensating circuit. Thus, for a given demodulator output, the gains of the various amplifier tubes determine the frequency response of the entire detection system and these gains must be so chosen that anomalies desired to be detected are transmitted through the detection system before compensation for the unbalance produced thereby can occur.

It will appear that the choice of amplification to obtain the proper frequency response also determines the amount of feedback to the elements corresponding to a given unbalance. Furthermore, the amount of feedback determines the residual unbalance remaining after compensation has occurred. Thus, if a ten-fold feedback is used, approximately one-eleventh of the unbalance will remain after the compensation circuits have operated. From the above, it can be seen that the ultimate operating range over which automatic compensation can occur to maintain the magnetometer elements within their most sensitive operating range, is determined by the choice of frequency response for the detection system. If, for example, magnetometer elements 10 and 12 will tolerate a resultant field acting upon them of ±1,000 gammas and operating conditions corresponding to a ten-fold feedback are used, the ultimate latitude afforded by the compensation system is approximately ±11,000 gammas.

While the choice of components in the circuits just described depends to a large extent upon the frequency range of anomalies to be investigated and upon the type of magnetometer to be used, the following constants were used in one successful embodiment of the invention in which the compensation system was applied to the magnetometer and detection system described in the copending applications referred to above. Input transformer 20 had a step-up turns ratio of 1:22; vacuum tubes 44 and 46 each comprised one half of a type 6SN7 tube; resistors 48 were each 300 ohms; resistors 50, 52 and 54 were each 2500 ohms; bridge resistors 34 were each 5,000 ohms; and bias current battery 30 had a rating of 7.5 volts. Variable resistor 29 had a total resistance of 12,000 ohms and bias battery 27 had a rating of 22.5 volts. The positive potential indicated at B+ was 300 volts.

Under these conditions, feedback to the magnetometer elements was approximately fifteen-fold. The time constant of the compensation circuit was then such that signals having frequencies above 0.02 cycle per second were transmitted before compensation could occur. With the amount of feedback determined by the pass band, as pointed out above, the ultimate latitude of the system was found to be approximately ±17,000 gammas, this value depending, of course, upon the inherent latitude of the particular magnetometer employed.

Under certain conditions, the circuit constants of the compensating system described above may advantageously be changed to produce a pass band such that compensation occurs before any signals due to anomalies can be transmitted. For this purpose, the amount of feedback is increased substantially by increasing the gain of the several amplifier stages in the system. The increased feedback results in considerably greater latitude of operation, due to the fact that the residual unbalance after compensation has occurred is greatly reduced. Since compensation occurs before signals due to anomalies are transmitted, the signal output of the demodulator to the remainder of the detection system is greatly reduced being, for example, less than one-twentieth of the input signal from the magnetometer elements if twenty-fold feedback is used. This necessitates greater amplification in the remainder of the detection system, but the gain in latitude may nevertheless justify the use of such amplification.

Having thus described our invention, what we claim is new and desire to secure by Letters Patent of the United States is:

1. In a compensated magnetometer system for measuring changes other than protracted changes in a magnetic field, a magnetometer sensitive to all changes in said field, a source of compensating current for said magnetometer, and means for controlling the flow of said current from said source to said magnetometer, said means comprising a normally balanced bridge circuit including a pair of variable impedance elements, the input diagonal of said bridge being connected to said current source and the output diagonal of said bridge being connected to said magnetometer, and means operable in response to variations in the output of said magnetometer due to all changes in said field but effective only after a chosen time delay to vary the impedance offered by said impedance elements, said time delay being such that compensation occurs only for protracted changes in said field.

2. In a compensated magnetometer system for measuring changes other than protracted changes in a magnetic field, a magnetometer sensitive to all changes in the magnetic field, a source of compensating current for the magnetometer, and means for controlling the flow of the compensating current from the source to the magnetometer, said means comprising a normally balanced bridge circuit including a pair of variable impedance elements, the input diagonal of the bridge being connected to the current source and the output diagonal of the bridge being connected to the magnetometer, and means operable in response to variations in the output of the magnetometer due to all changes in the field but effective only after a chosen time delay to vary the impedance offered by the impedance elements, said time delay being such that compensation occurs only for protracted changes in the field and permits signals of a predetermined frequency to be recorded.

3. In a compensated magnetometer system for measuring changes other than protracted changes in a magnetic field, a magnetometer sensitive to all changes in the magnetic field, a source of compensating current for the magnetometer, an electrical bridge network for controlling the flow of the compensating current from the source to the magnetometer, and means operable in response to variations in the output of the magnetometer due to all changes in the field but effective only after a chosen time delay to vary the controlling action of the bridge network.

4. In a compensated magnetometer system for measuring changes other than protracted changes in a magnetic field, a magnetometer sensitive to all changes in a magnetic field, a source of compensating current for the magnetometer, an electrical bridge network including non-linearly variable elements for controlling the compensating current, and means operable after a chosen time delay for varying the non-linear elements in response to variations in the output of the magnetometer.

5. Apparatus in combination with a magnetometer system for controlling the ambient magnetic field therein, comprising means for establishing a counter magnetic field in the magnetometer system, manual means for making rough adjustments of said counter magnetic field, and automatic means including a bridge network controlled after a chosen time delay by the output of the magnetometer for making fine adjustments of said field.

6. In a magnetometer system for indicating variations in an ambient magnetic field, means for controlling the sensitivity of the system comprising means for establishing a counter magnetic field, means for amplifying the output signals from the magnetometer system, means for demodulating said signals, means for amplifying a portion of each of the demodulated signals, means for controlling the counter magnetic field in accordance with the unbalance of the demodulator currents, said means including an electrical bridge network comprising variable non-linear impedance elements arranged to introduce a time delay before compensation can occur, thereby permitting a signal of a predetermined frequency to be recorded.

OTTO H. SCHMITT.
JOHN H. HIDY.

REFERENCES CITED

The following references are of record in the file of this patent:

UNITED STATES PATENTS

| Number | Name | Date |
|---|---|---|
| 2,053,154 | La Pierre | Sept. 1, 1936 |
| 2,112,826 | Cook | Apr. 5, 1938 |
| 2,158,500 | Guerra | May 16, 1939 |